United States Patent [19]

Moeglich

[11] 4,161,435
[45] Jul. 17, 1979

[54] PROCESS AND APPARATUS FOR REDUCING THE LEVEL OF CONTAMINANTS IN AQUEOUS ELECTROLYTES CONTAINING THE SAME

[75] Inventor: Karl Moeglich, Dunedin, Fla.
[73] Assignee: Innova, Inc., Clearwater, Fla.
[21] Appl. No.: 841,925
[22] Filed: Oct. 13, 1977
[51] Int. Cl.² ............................ C02C 5/12; C02B 1/82
[52] U.S. Cl. .................................. 204/152; 204/1 R; 204/149
[58] Field of Search ............... 204/149, 152, 1 R, 151; 210/42 R, 64

[56] References Cited

U.S. PATENT DOCUMENTS

| | | | |
|---|---|---|---|
| 3,853,736 | 12/1974 | Harnden et al. | 204/149 X |
| 3,915,822 | 10/1975 | Veltman | 204/151 |
| 3,919,062 | 11/1975 | Lundquist | 204/149 |
| 3,945,892 | 3/1976 | James et al. | 204/1 R |
| 4,038,163 | 7/1977 | Casanovas et al. | 204/149 X |
| 4,048,030 | 9/1977 | Miller | 204/149 |
| 4,053,378 | 10/1977 | Moeglich et al. | 204/1 R X |

OTHER PUBLICATIONS

Hiddleston et al., "Fluidized Bed Electrodes", *Nature Magazine*, vol. 218, pp. 601 and 602, May 11, 1968.

*Primary Examiner*—Arthur C. Prescott
*Attorney, Agent, or Firm*—Cushman, Darby & Cushman

[57] ABSTRACT

An electrochemical process for reducing the level of contaminants in an aqueous electrolyte containing the contaminants comprising: suspending particles in the electrolyte in a reaction zone defined by a pair of electrodes to obtain a suspension containing from 1 to 40% by volume of the particles, establishing high turbulence sufficient to maintain the particles in a state of violent agitation, and passing an electric current between the electrodes to generate an electric field in the turbulent electrolyte in the reaction zone. Advantageously the turbulence of the electrolyte corresponds to a Reynolds number above about 3,000 and preferably is in the range of about 10,000 to 50,000. Apparatus for carrying out the process is also disclosed.

17 Claims, 12 Drawing Figures

PROCESS AND APPARATUS FOR REDUCING THE LEVEL OF CONTAMINANTS IN AQUEOUS ELECTROLYTES CONTAINING THE SAME

The present invention is concerned with an electrochemical process and apparatus for reducing the level of contaminants dissolved or suspended in an aqueous electrolyte.

BACKGROUND OF THE INVENTION

Various procedures have previously been proposed for electrochemically removing dissolved or suspended material from aqueous solutions or suspensions thereof. Some of these prior procedures have involved the use of so-called "extended" electrodes where the aqueous electrolyte to be treated is passed through a relatively dense, essentially static bed of conductive particles positioned between a pair of electrodes. In an alternative approach, conductive particles are gently "fluidized" or suspended in the electrolyte as current is passed between the electrodes. In either case, the particles effectively extend the surface area of the electrodes and thus improve overall conductivity and heat transfer. Representative of these prior procedures are those described in the following U.S. Pat. Nos.:

3,728,238
3,730,864
3,755,114
3,764,498
3,915,822
3,919,062

While electrochemical procedures using extended electrodes of the type indicated may make it possible to remove various materials or contaminants from aqueous electrolytes for the purpose of improving the quality of the electrolyte and/or for recovery of the materials therein, certain disadvantages are also encountered. For example, undesired depositions tend to occur on the electrodes and the particles. This requires frequent cleaning and/or replacement of the electrodes and particles and reduces the cell efficiency. Undesired depositions are particularly likely to occur in the case where organic compounds present in the electrolyte are oxidized. This results in a gradual passivation of the electrode, usually the anode, and the creation of a high voltage drop at the electrode interface. Another problem is that complex organic compounds are not usually completely oxidized and there is a tendency to form by-products which give the treated electrolyte an undesirable yellow or brownish color. The deposition of residues on the anode and the discoloration of the electrolyte are particularly noticeable when the anode is immersed in a packed bed of electrically conductive particles. For example, with a packed bed of graphite particles, unacceptable fouling of the anode and discoloration of the electrolyte often occur even with low electric currents and low electrolyte temperatures.

High operating cost is another problem with prior procedures. Addtionally, they are often limited to the use of special conditions, e.g. narrowly controlled electrolyte pH and temperature and they normally are only effective using D.C. current.

OBJECTS OF THE INVENTION

The principal object of the present invention is to provide certain unique improvements in the electrochemical processing of aqueous electrolytes to reduce the level of contaminants therein. Another object of the invention is to obviate difficulties encountered in prior extended electrode procedures of the type described above. Other objects and advantages will be hereinafter evident.

SUMMARY OF THE INVENTION AND ITS ADVANTAGES

Broadly defined, the present invention provides a process for reducing the level of contaminants in aqueous electrolytes containing the same which comprises suspending particles, which are preferably electrically conductive although not necessarily so, in the electrolyte in a reaction zone defined by a pair of electrodes to obtain a suspension containing from 1 to 40% by volume of the particles, establishing high turbulence sufficient to maintain the particles in a state of violent agitation, and applying a voltage between the electrodes to generate an electric current in the turbulent electrolyte in the reaction zone.

The apparatus for carrying out the process may be broadly described as comprising an appropriate treatment vessel, a reaction zone within the vessel defined by a pair of electrodes, means for providing a suspension of particles in an electrolyte in the reaction zone, means for establishing high turbulence in the electrolyte, means for passing an electric current between the electrodes, and means for withdrawing treated electrolyte from the reaction zone.

The success of the invention is dependent, in large measure, on the feature of establishing a high degree of turbulence in the suspension of particles in the electrolyte undergoing treatment. This is a fundamental departure from prior procedures where the electrolyte is either passed through the particles in a relatively static porous packed bed or the particles are kept in a gently fluidized or suspended state in the electrolyte by flow of the latter.

It is also important to the invention that the volume of particles which are suspended in the turbulent liquid be kept relatively low, i.e. in the range of 1 to 40%, preferably 5 to 20%, of the total volume (electrolyte plus particles). This is another fundamental difference over packed or suspended particle beds where the bed porosity is relatively low and the volume ratio of the particles to electrolyte is relatively high.

Some of the advantages of the invention include the following:

(1) The high degree of turbulence in the electrolyte insures faster reaction times and savings in power. More effective oxidation and/or reduction reactions can take place and suspended particulate contaminants can be readily agglomerated. Odor and colors can be removed from waste waters, and colloidal organics may be effectively oxidized, reduced and/or otherwise altered into an agglomerated state permitting easy mechanical removal. Compounds such as hydrogen sulfide, ammonium hydroxide, polychlorinated biphenols, organic pigments and the variety of organics occurring in conventional sewage can be oxidized and removed from the water regardless of the concentration involved.

(2) The deposition of undesired residues, e.g. oxidation or reduction by-products from organics or other compounds, which would conventionally occur at one or both electrodes and/or on the added particles, does not result due to the turbulence of the particles in the electrolyte. The particles and electrodes are essentially self-cleaning. This represents an important advantage in that it reduces to a minimum shutdown time for the replacement or cleaning of the electrodes and particles.

(3) Because the particles are in the turbulent state, reactions involved occur throughout the reaction zone and are not confined to the immediate electrode region as in the case where the electrolyte is processed under non-turbulent conditions. This also serves to reduce the time involved for accomplishing the desired treatment.

(4) Contact between the electrodes and particles, although generally preferable, is not required. As a consequence of this and the fact that reaction occurs throughout the reaction zone as noted in (3) above, it is possible to use A.C. current as well as D.C. current although D.C. is preferred. The possibility of effectively using A.C. current is a distinct advantage over prior procedures which require the use of D.C. current.

(5) The process can be used to simultaneously effect oxidation, reduction and agglomeration of contaminants in the electrolyte. It is believed that each of the particles suspended in the electrolyte, at least in the case of conductive particles, will carry an electrical charge with a resultant high induced potential or voltage gradient at the particle edges of up to 100,000 volts/cm. Without intending to be limited to any theory of operation, it appears that this potential gradient is responsible for the production of oxidizing elements from the water component of the electrolyte. The water is probably dissociated into $H^+$, $OH^-$, ozone and hydrogen peroxide, any or all of which could be useful to oxidize or reduce contaminants. The gradient would also apparently serve in similar fashion to break down the molecular water film around particulate contaminating matter in the electrolyte, and cause such matter to agglomerate and collect.

(6) The high turbulence enables the charged particles to move an appreciable distance through the electrolyte while the charge thereon is still intact. This motion has several consequences. Firstly, it enables the charged particles to approach other particles with opposite charge, thus generating a field gradient sufficient to dissociate water molecules. It also enables the charged particles to contact suspended particulate matter or contaminant in the electrolyte thereby causing such matter to coagulate. It additionally enables the charged particles to contact the electrodes resulting in (a) removal and replenishment of the boundary fluid layer at the electrode to improve the conductivity; (b) mechanical removal of fouling elements on the electrode; (c) oxidation or reduction of electrode passivation agents; and (d) oxidation or reduction of organic products formed at the electrode.

(7) It also appears that the turbulent motion of charged particles according to the invention causes a charge migration to occur inside the particle equivalent to an internal current which produces a transient inductive field. This can apparently cause beneficial electrical and electro-magnetic effects on certain molecular constituents in the electrolyte, aiding in oxidation and breaking down complex organic molecules. Furthermore, while it is preferred to operate the process of the invention with the application of electric current from an external power source, it is considered possible in some cases to operate effectively without such application by relying exclusively on the internal galvanic current which occurs between the particles and the electrodes.

(8) A further advantage of the invention is that the process is not dependent on the pH and temperature of the electrolyte. This constitutes a substantial departure from other procedures where careful control of the pH and/or temperature is essential to obtain the desires results. Additionally, the process does not require the use of catalysts or diaphragms and can be operated at low voltages.

DETAILED DESCRIPTION OF THE INVENTION

Figure 1:
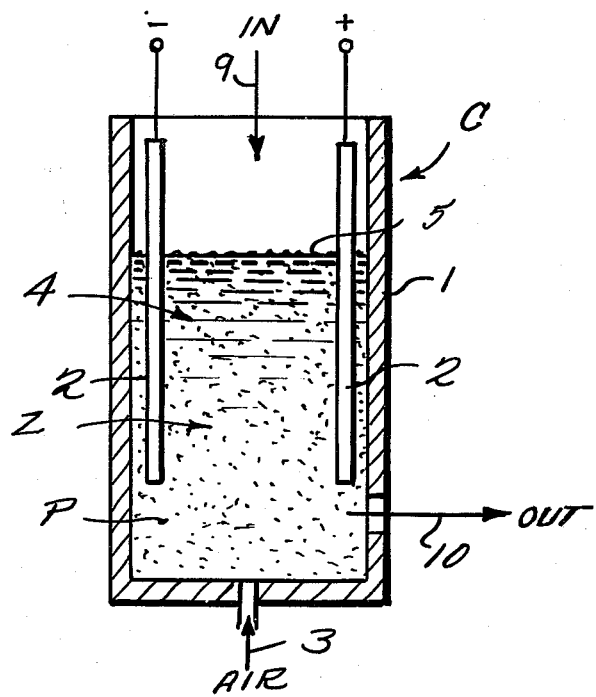

The turbulence of the electrolyte according to the invention should correspond to a Reynolds number above about 3000. Preferably the turbulence corresponds to a Reynolds number in the range of about 10,000 to 50,000 although turbulence equivalent to a higher Reynolds number, e.g. 100,000 or more is also contemplated.

The desired turbulence may be obtained by various means, e.g. by air sparging, magnetic or mechanical stirring using one or more high speed mixers, or by feeding the electrolyte into the reaction zone at high velocity against one or more baffles. These alternatives may be used with batch or continuous operations according to the invention.

In some instances, depending on the electrolyte being processed and other factors, the turbulence may cause a relatively large amount of foaming. Various physical and/or chemical means may be used to control any undesirable amount of foaming. For example, conventional anti-foaming agents may be added to the electrolyte. Alternatively, or in addition thereto, baffles, foam overflows or other apparatus arrangements may be provided to accommodate and control foaming.

The process may be used to treat a wide variety of aqueous electrolytes containing one or more contaminants. The contaminants may be undesired waste products which have no value or they may include metals or the like which are sufficiently valuable to warrant recovery or conversion to useful materials. It will be evident, therefore, that the term "contaminant" as used herein is not intended to imply that the contaminating matter is undesirable per se.

Typically, the invention is used for pollution control, electrochemical synthesis, recovery of useful materials dissolved or suspended in aqueous liquids or the like. Sewage or other waste waters can be processed according to the invention to remove odors and colors therefrom. This may involve the oxidation, reduction and/or agglomeration of, for example, colloidal organic materials permitting ready removal by conventional mechanical means. Other uses of the invention include the synthesis of organic and inorganic compounds, the oxidation of trivalent chromium ions to the hexavalent state, electrochemical precipitation and coagulation processes, collection of slimes, oils and paints, and many other useful industrial operations. Compounds such as sulfides, ammonium hydroxide, polychlorinated biphenols, organic pigments and the variety of organics in sewage can be oxidized by the present process and readily removed from water containing the same regardless of their concentration in the water. The ability of the present process to oxidize ammonium hydroxide appears to be a particularly unique feature. Potassium permanganate can also be reduced by means of the process, and emulsions of fatty acids, as used for flotation purposes in the phosphate mining industry, as well as the clay slime from phosphate flotation process, can be readily treated.

In addition to the electrochemical reactions, other simultaneous chemical reactions may be conducted employing reactants introduced to the electrolyte in the reaction zone. For instance, reactive gases or liquid streams may be mixed with the electrolyte in one or more of the cell sections.

The process may also be used in the production of improved plastics, for example, by the utilization of the free radicals which are produced in the reaction zone, such as $OH^-$, to effect long-chain polymerization resulting in a higher molecular weight plastic with improved properties. Other similar applications for free radicals will be apparent to those skilled in the art.

Pathogenic microorganisms including spores and virus may also be inactivated electrochemically according to the present invention. It is believed that electrochemical treatment of water-borne pathogens is especially useful where the microorganisms have a net negative charge and can be attracted electrophoretically to an anodic or charged particle surface for reaction with nascent oxygen or ozone at the charged surface.

As noted, particles should be added to the electrolyte treated according to the invention, these particles constituting from 1 to 40%, preferably 5 to 20%, of the electrolyte volume. The exact amount of particles added for optimum results will depend on other factors, e.g. the nature, size and shape of the particles, the electrical parameters, etc.

The added particles may be composed of a wide variety of materials which are generally insoluble in the electrolyte. Preferably, the particles used in a particular treating zone are homogeneous in terms of composition, size and shape although this is not essential. The same or different materials may be used in different treating zones arranged serially if a plurality of such zones are used. If oxidation or reduction is involved in the treatment, the added particles should be electrically conductive or semi-conductive. Such particles may be metallic or they may comprise a non-conductive material which has been coated with a metal. Typically, suitable metals for use herein include platinum, copper, silver and the like.

The added particles may also comprise electrically conductive metal compounds, such as ferrophosphorus, carbides, borides, nitrides or oxides such as lead dioxide, ruthenium dioxide or the like. Preferably, however, the particles comprise graphite, and most preferably are graphite flakes.

Semi-conductive materials which may be used as the added particles include fly ash, carbon, zirconia, alumina, conductive glasses and the like. Mixtures of any of the above materials with one another or with insulating particles may be used.

If the contemplated treatment only requires coagulation, i.e. oxidation or reduction is not required, electrically insulative particles, i.e. particles having a high electrical resistance may be used. It is possible that some oxidation and/or reduction reactions will occur using only insulative particles. However, the essential action with insulative particles appears to be coagulation or agglomeration which apparently results from the high voltage gradient existing at the edges of the particles. This is contrary to prior art proposals which have obtained coagulation or agglomeration by metal hydroxides formed electrochemically at the anode. The present process does not require the generation of metal hydroxides to effect coagulation. Typically suitable insulative materials for use herein include plastics such as nylon or polyesters; glass or ceramics.

The size, shape and density of the particles used herein, conductive or insulative, can be widely varied. Usually, however, the particle size will fall in the range of 0.02 to 0.4 cm in maximum dimension although sizes outside this range may be used in certain cases.

As for particle shape, flake is preferred in some cases although particles in the shape of rods, needles, discs, spheres, cylinders, lumps or the equivalent can also be used.

The particle density should be selected for the particular electrochemical use involved. Several factors can influence the choice of density, including particle size, agitation, reaction kinetics, particle material, electrolyte flow rate and other operating conditions. Generally speaking, however, the density of the particles employed should be such that the particles remain suspended in the electrolyte when the latter is in the required turbulent state.

The preferred particles for use herein consist of thin graphite flakes with a preferred size which will pass a 10 mesh screen and not pass a 48 mesh screen. Such flakes are commercially available, for example, DIXON No. 1 flakes. Larger or smaller flakes, however, may be used without departing from the invention. Usually with the preferred graphite flakes, the amount of flakes used, on a volume basis, will fall in the range of 5-20% of the total volume of electrolyte and graphite.

The concentration of contaminants in the electrolyte to be treated is not critical and can be widely varied. Typically the contaminant concentration may vary from well under 1 ppm up to several percent (e.g. up to 5-10% by weight) based on the weight of the electrolyte.

The duration of the treatment according to the invention will necessarily vary depending on other operating factors, e.g. the nature and amount of contaminants involved, the degree of agitation, the size of the reaction zone, whether batch or continuous operations are involved, etc. However, the treatment should be continued for a time sufficient to significantly reduce the contaminant level in the liquid although it should be noted that it is not necessary to process the electrolyte to the point where all of the contaminant therein has been removed. Typical treatments may involve just a few seconds up to several hours, e.g. 2-6 hours, or even longer.

Electrical parameters in the cell can vary widely, especially with regard to the applied voltage and current density. High current densities are not essential for effective operation of the process and, generally speaking, cell efficiency appears to be highest at low current densities. Normally, the current densities employed will range from 0.01 amp/in$^2$ to 5 amp/in$^2$ with a preferred range of from 0.05 to 0.6 amp/in$^2$.

The voltage impressed across the cell or cell sections can also be widely varied and will depend upon various factors, e.g. the electrolyte conductivity, the distance between electrode pairs, retention time, and the nature of any reaction involved. Typically, it is found that a potential gradient of about 0.1 to 10 volts/cm can be used.

As indicated, the process is effective using A.C. current although D.C. current is preferred. If desired, means may be provided for varying the applied current or voltage gradient from one reaction zone to another. A single power supply may be used to apply different voltages to adjacent reaction zones by utilizing external resistances in one or more circuit loops.

As noted, the process is not dependent on the pH of the electrolyte. Accordingly, the pH of the electrolyte may be varied over a wide range, although it preferably falls in the range of about 2 to about 11. Adjustment of the pH if desired may be carried out by the addition of various acids, bases or salts to the electrolyte, the ultimate selection depending on the composition of the electrolyte. The conductivity of the electrolyte will usually be substantially less than that of the added particles and, if the electrolyte conductivity is very low, the addition of an acid, base, or salt may improve the process efficiency by increasing the current for a given voltage. Thus, for exxample, while the addition of salt is not essential, it has been found that increasing the salt content in the case of some waste water effluents will increase the current efficiency. Typically suitable materials for adjusting the pH of the electrolyte include aqueous solutions of borates, ammonia, sodium hydroxide, hydrochloric acid, and the like.

The temperature of the electrolyte may also vary over a wide range, the primary requirement being that the electrolyte remains a liquid at the temperature employed. Temperatures within the range of about 0° to 100° C. are usually suitable and it has been found that temperatures of 20°-70° C. may be particularly desirable in effecting rapid reaction depending upon the particular electrolyte, pH range, type and concentration of contaminant. For economy of operation, it is generally preferred to operate at ambient temperatures although it will be recognized from what has been said that other temperatures may also be effectively used.

The process is desirably carried out at atmospheric pressure although either higher or lower pressures may be employed if desired.

The apparatus of the invention can be made with conventionally available materials. The outer vessel, which defines the cell in its broadest aspects, may be of any convenient size and configuration, such as rectangular or cylindrical and may be constructed of conductive or non-conductive material. Thus, for example, the vessel may be formed of glass, plastic, ceramic, rubber, metal such as steel, or the like provided the material selected is resistant to the electrolyte which is treated therein. Preferably the material employed is electrically non-conductive but if a conductive material is chosen for use, a non-conductive lining should be provided to prevent short circuiting of the electrodes.

The electrodes themselves may be constructed of any electrically conductive material normally employed for electrochemical electrodes. Thus, for example, the electrodes may comprise stainless steel, aluminum, platinum or other platinum-group metal as such or coated onto metals such as titanium or tantalum, e.g. platinized titanium, or non-metallic conductor, such as carbon (graphite). The electrode may be in any convenient form, e.g. a solid or perforated bar, woven cloth or fibrous form. Normally the electrodes are spaced from each other a distance of $\frac{1}{8}''$ to 2" although it will be appreciated that this spacing can be varied and distances outside the recited range can be effectively employed.

During the operation of the process, the electrodes can be enveloped in insulating material, e.g. asbestos, since conductive particles as employed herein, need not contact the electrode. According to the invention, the conductive particles are given an electric charge by electrostatic induction, contrary to the ohmic conduction necessary in the previously known procedures using fluidized or packed particle beds.

The treatment vessel may comprise one or more treating zones defined by electrode pairs. Where multiple zones are involved, these may be designed to simultaneously treat different electrolytes. Alternatively the zones may be interconnected so that electrolyte can pass sequentially through the zones, the electrolyte flow normally being generally parallel to the electrodes. Appropriate means may be provided for the purpose of feeding electrolyte from one zone to the next. This may simply involve an overflow opening near the top of the electrode. Usually this is used in combination with a screen or equivalent which prevents the particles in one zone from following the electrolyte into the next zone. Means should also be provided to maintain the electrolyte in the turbulent condition in each zone consistent with the invention. Settling areas or the like may also be provided between treating zones and/or after the last such zone to permit the added particles and any agglomerated residue or precipitate to settle out. Electrochemical properties may be varied from one treating zone to another by using different types of particles and/or different voltages.

Electrolyte flow can be varied widely from a zero flow rate as in a batch process, to high flow rates, limited only by the retention time necessary for the desired reaction. A variety of electrochemical reactions can be carried to substantial completion in a single pass through one or more reaction zones operated according to the invention using flow rates of about 100-200 ml/min per liter of reaction zone although it will be appreciated that other flow rates may be used, flow rates and residence times being normally adjusted for best results depending on the particular electrochemical phenomenon and cell configuration involved.

The invention is further described by reference to the accompanying drawings wherein:

FIGS. 1-4 are schematic vertical cross-sectional views of various different electrochemical cells which are suitable for practicing the invention; and FIGS. 5-12 graphically illustrate results obtained using the invention in the processing of different types of aqueous electrolytes.

Referring more specifically to the drawings, wherein like numerals represent like members, FIG. 1 shows an electrochemical cell (C) comprising a vessel (1) of desired size and shape with a treating zone (Z) defined by a pair of electrodes (2), one of which is intended to be positive and the other negative as shown.

The vessel (1) is also provided with an inlet (3) for the supply of air adequate to agitate the electrolyte (4) and keep it in turbulent condition as required. Appropriate air diffuser means (not shown) may be provided near the bottom of the cell to assist in distributing the air fed into the cell although this is not essential.

Contaminated electrolyte is supplied to zone (Z) via the open top (9) of vessel (1), the level of the electrolyte being shown at (5). An outlet (10) is also provided in vessel (1) below the electrodes and near the bottom thereof for removal of the processed electrolyte.

Suspended in the electrolyte (4) are particles (P), which are preferably electrically conductive although not necessarily so as mentioned above. These particles should comprise from 1 to 40% of the total volume of electrolyte in the zone (Z). Particles (P) may be suspended in the electrolyte before or after the electrolyte is supplied to zone (Z).

The cell of FIG. 1 may be used for batch or continuous flow operations. Means (not shown) may also be provided for recycling electrolyte removed through outlet (10) for further treatment in the zone (Z) via inlet (9).

The air inlet (3) may be replaced by, or used in conjunction with, other means for accomplishing the desired turbulence in the electrolyte. For example, mechanical or magnetic stirring means may be provided or the electrolyte may be fed at high velocity against one or more baffles positioned in the cell.

The operation of the cell (C) shown in FIG. 1 will be evident from the foregoing description. Electrolyte to be treated is fed into the zone (Z) by means of inlet (9) to the level (5). The particles (P), e.g. graphite flakes, are added to the electrolyte before or after the electrolyte is placed in zone (Z). The resulting suspension is then agitated by means of air fed in through inlet (3) to give the desired degree of turbulence while current is applied to the electrodes. The treatment is continued for the desired length of time, e.g. until the electrolyte, if colored, appears clear and/or substantial amounts of contaminants have been agglomerated, oxidized, or reduced. The electrolyte is then removed through outlet means (10). The particles and coagulated contaminant in the electrolyte can then be separated from the electrolyte by suitable means, e.g. screening, filtering, centrifugal separation or the like. Separated graphite flake or other particles used in the process may be reused.

Figure 2:
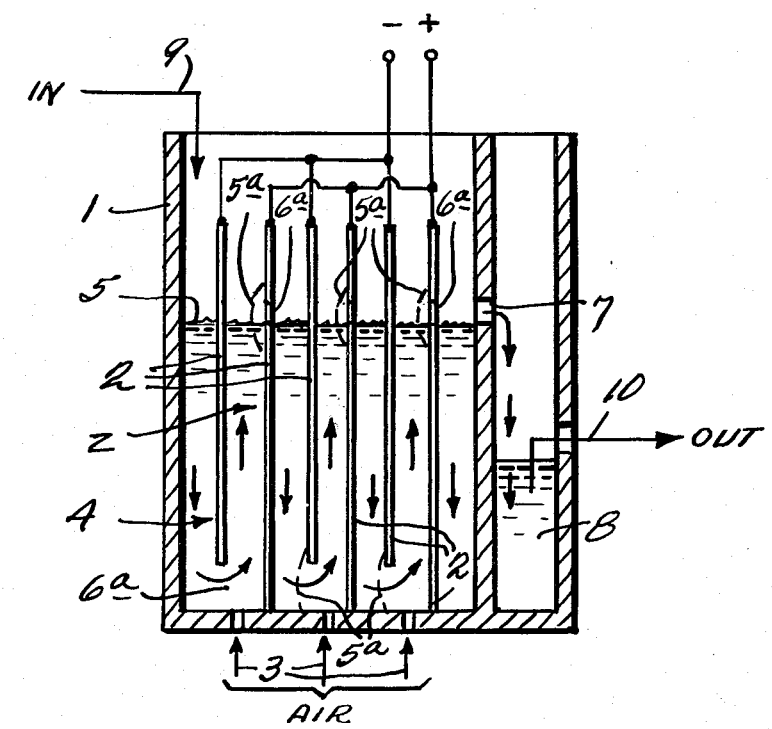

FIG. 2 shows a cell (C) which includes multiple pairs of electrodes (2) and is designed to have the electrolyte follow a circuitous flow between each electrode pair before discharge from the cell. More specifically, the cell (C) of FIG. 2 comprises the vessel (1) with the plural treatment zones (Z) defined by the electrodes (2) which are of alternating polarity as shown. Air to agitate the electrolyte is fed into the cell through inlets (3) positioned between alternating pairs of oppositely charged electrodes. The electrolyte is supplied through inlet (9) and is discharged after treatment at (10) after flowing through the cell on the path shown by the arrows. In this embodiment, the air may also help to flow the electrolyte through the various treating zones (Z) to the discharge (10) via intermediate discharge (7) and reservoir (8). Agglomerated or precipitated matter may be allowed to at least partially settle out in reservoir (8) and/or the treated electrolyte (including suspended matter) may be discharged at (10) for further processing.

Appropriate screening (5a) is provided in the apparatus of FIG. 2 to prevent particles from passing from one zone to another as the electrolyte is passed through the unit by means of the inter-connecting holes or openings (6a).

It will be evident that the electrolyte flow in FIG. 2 should be selected to give the desired residence time and treatment in each reaction zone. It will also be understood that the reservoir (8) in the apparatus of FIG. 2 is not essential and that the indicated air agitation may be replaced by other appropriate means such as mixing propellers. Other features of the apparatus and process may also be varied to suit particular operating conditions without departing from the invention.

To obtain the necessary residence time in a continuous flow system of the type exemplified by FIG. 2, the cell configuration may consist of a series of cells in a cascade arrangement. Alternatively there may be used a long channel-type cell which may be folded upon itself or spiraled to conserve space. Combinations of these alternatives may also be used.

Figure 3:
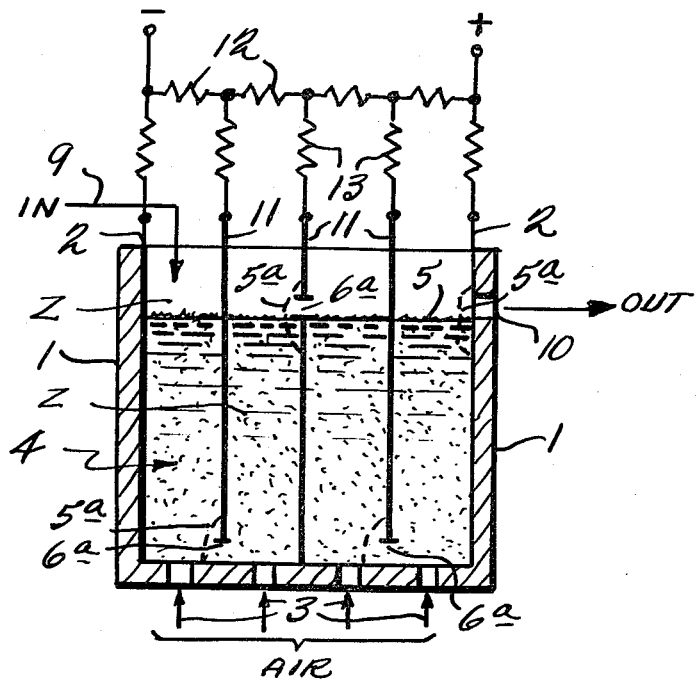

FIG. 3 shows an electrochemical cell (1) similar to that of FIG. 2, having multiple electrodes (2) defining reaction zones (Z) and a plurality of inner electrodes (11). As in the case of FIGS. 1 and 2, electrolyte to be treated is supplied to the cell via inlet (9) and air to create the essential degree of turbulence is supplied at (3). The inner electrodes (11) may have their voltage levels and their currents varied or adjusted by means of resistors (12) and (13) or by means of separate power supplies. Such adjustments are desirable in certain electrochemical reactions and may also serve to conserve power. Alternatively, the electrodes may be so connected as to form alternate anodic and cathodic sections, or such sections in any sequence or arrangement desired, each with an adjustable voltage and current capability, and each with a bed material and density adapted to the individual oxidation or reduction reactions desired.

Figure 4:
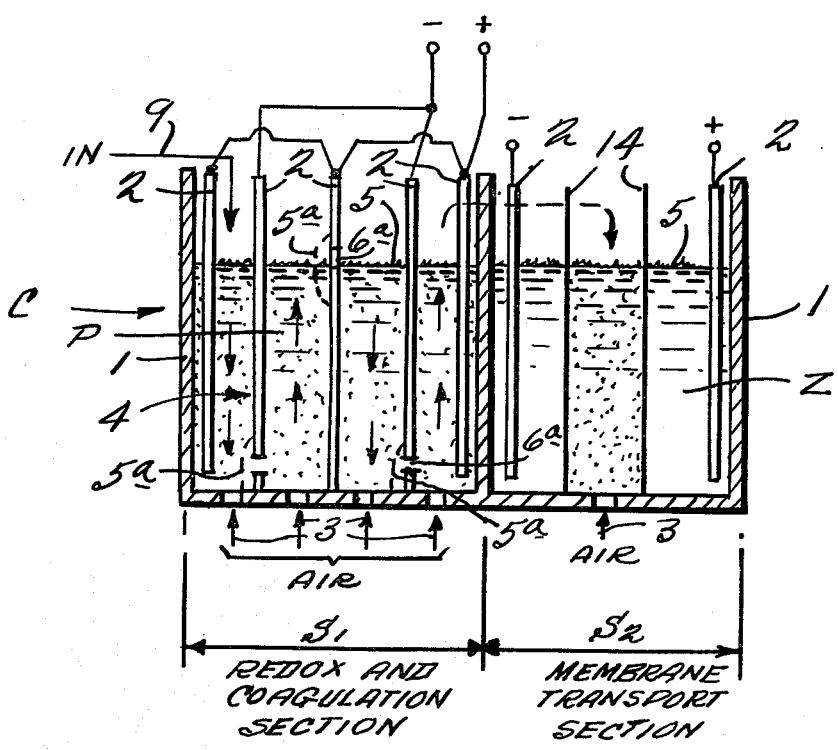

FIG. 4 shows an electrochemical reactor chamber or cell (1) having two sections. The first section ($S_1$) has primary electrodes (2), electrolyte (4) with turbulent bed particles (P), agitation means (3), and feed means (9). The reactions and operation of this section are as described previously. The output of this section is pumped or fed as shown by the arrow (X) into the middle of the second section ($S_2$) which contains primary electrodes (2), membranes (14), and agitation means (3) with graphite flakes in any or all zones or compartments, to obtain oxidation or reduction and coagulation reactions in combination with ionic transport reactions through the membranes (14), and also to increase the cell conductivity.

The membranes (14) are ionically permeable but are hydraulically impermeable or nearly so. The use of these membranes serves two principal objectives: to provide a plurality of discrete reaction zones within the cell with each zone having its own voltage and potential gradient; and to provide a means for the separation or isolation of different ionic species depending on the electrical and chemical conditions in each zone, and depending on the membrane material, the turbulent bed material, and the residence time. The membrances may all be identical or they may differ in characteristics as appropriate to the process.

Membranes (14) may be composed of thin films of plastic or other material commonly used in electrodialysis processes. The possibility of using such isolation membranes further shows that the charged conductive particles need not be in contact with the electrodes in the practice of the invention.

The cell of FIG. 4 may be used for combinations of reactions involving oxidation, reduction, ionic separations, coagulation, chemical synthesis, metal recovery, biological pathogen treatment, gaseous admixtures in the electrolyte and related processes. FIG. 4 designates the ($S_1$) and ($S_2$) sections as a redox and coagulation section and a membrane transport section, respectively, although it will be appreciated that these specific designations are given for illustration purposes only.

Several advantages accrue from the combination shown in FIG. 4 including: a reduced cell voltage requirement because of the graphite flakes which increase the conductivity, isolation of electrodes from reactants which do not pass the membrane, and more compact and efficient equipment due to the multiple reactions being done simultaneously.

The invention is further illustrated by reference to FIGS. 5-12 in conjunction with the following examples:

EXAMPLE 1: OXIDATION OF THYMOL BLUE

This example illustrates the use of the invention to oxidize Thymol Blue pigment in an aqueous electrolyte. The degree of oxidation is measured in terms of percent light transmission (wavelength 550 ,m$\mu$) through the treated electrolyte, the higher the transmission, the higher the degree of oxidation.

An aqueous solution of Thymol Blue pigment was treated using apparatus generally as shown in FIG. 1. Two separate experiments were performed. In one of these experiments, graphite flakes (constituting 10% of the electrolyte volume when measured dry) were suspended in the electrolyte. The other experiment was carried out without graphite flakes but under otherwise comparable conditions. The solution of Thymol Blue (thymolsulfonenaphthalein) as initially obtained for the tests had a 0.04% (by weight) concentration of the pigment. The solution was placed in the cell and diluted 12 to 1 in water after which the graphite flakes (Dixon No. 1 flakes) were added in one test and omitted in the other. The electrolyte in both tests was vigorously agitated by means of air to provide a degree of turbulence corresponding to a Reynolds number in the range of 10,000 to 50,000. A current density of 6 ma/cm$^2$ and an electrode voltage of 50 volts DC were employed. The treatment was conducted for about 15 minutes during which the electrolytes in the two cases were examined for retained color (measured on the basis of the percent light transmittance of the electrolyte).

Figure 5:
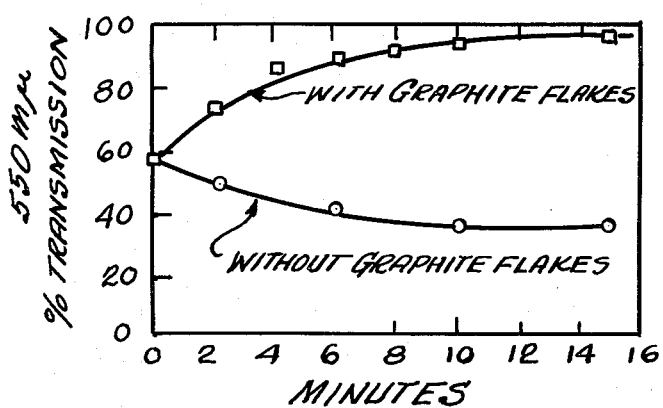

The results of the tests are shown in FIG. 5 where percent light transmission (at 550 m$\mu$) is plotted against the time of treatment for the electrolytes. The upper curve in FIG. 5 shows that the Thymol Blue pigment was essentially completely oxidized to give a colorless liquid during treatment using the graphite flake and turbulent conditions according to the invention while the lower curve shows that the treatment without graphite flakes was not satisfactory as evidenced by the fact that the light transmission of the electrolyte was actually reduced indicating an increase in color rather than a decrease thereof.

EXAMPLE 2: REDUCTION OF POTASSIUM PERMANGANATE

The process of Example 1 was essentially repeated using an aqueous potassium permanganate solution and graphite flakes with and without turbulent conditions. The results are illustrated in FIG. 6 which shows the reduction of KMnO$_4$ as measured by the percent light transmittance of the electrolyte, as a function of the ampere-minutes, for A.C. and D.C., with and without graphite flakes.

Figure 6:
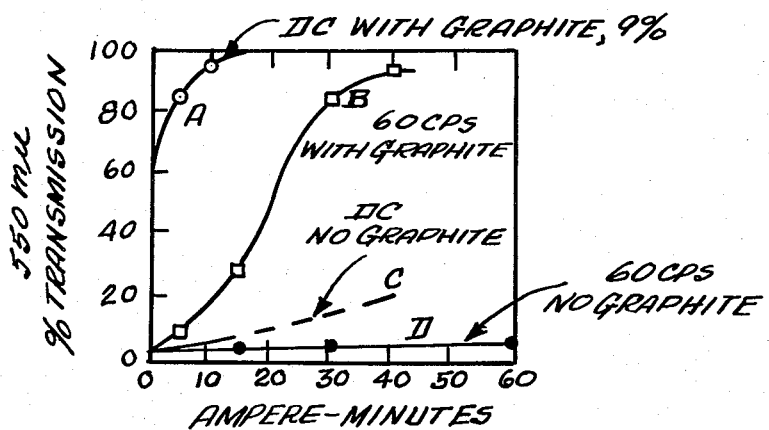

The upper curves A and B in FIG. 6 show a marked increase in transmittance when the graphite flakes are used in the turbulent bed process with D.C. and with A.C. (60 cps). The use of D.C. is also seen to be superior to A.C. by a factor of at least four (compare curves A and B, respectively). The lower curves C and D in FIG. 6 show a very slow reduction reaction when no graphite flakes are used with both D.C. and A.C. In this example, the electrolyte consisted of 100 ppm of KMnO$_4$ with 10% by volume of graphite flakes. Stainless steel electrodes were used with a current density of 6 ma/cm$^2$, voltage about 70 volts.

EXAMPLE 3: OXIDATION EFFICIENCY VS. CURRENT DENSITY

Figure 7:
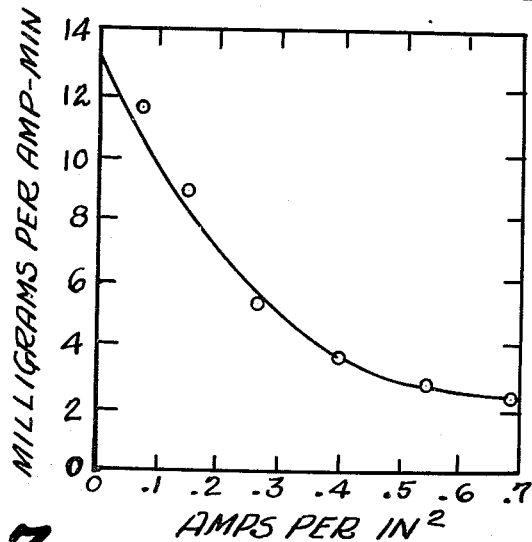

The process of Example 2 was essentially repeated but using an aqueous solution containing 600 ppm phenol and 30% by volume of graphite flakes with air agitation to create the desired turbulence. Current density was varied to determine the phenol oxidation efficiency at different current densities. The results are indicated in FIG. 7 which shows the oxidation efficiency in units of mg phenol removed from the aqueous electrolyte per ampere-minutes (removal efficiency) vs. current density (amp/cm$^2$). The FIG. 7 results show that the lower the current density, the more efficient the oxidation process.

EXAMPLE 4: OXIDATION VS. PERCENT GRAPHITE PARTICLES

Figure 8:
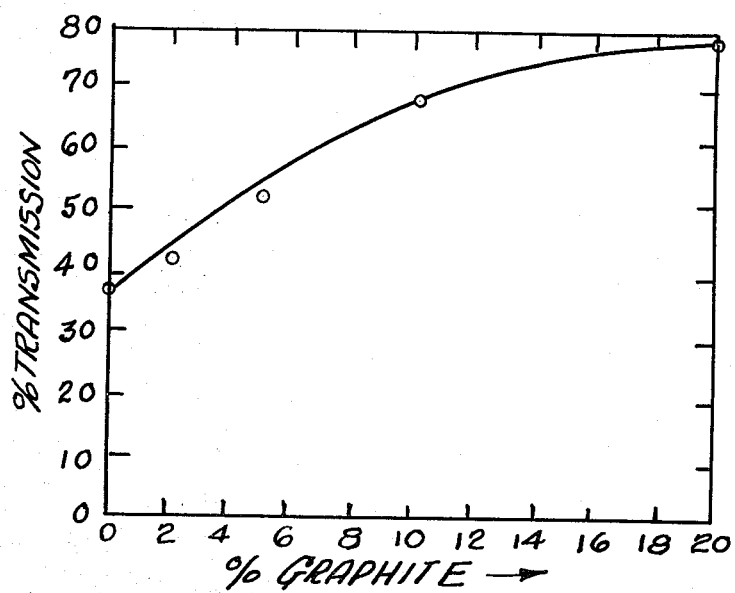

Experiments were run using a process according to the invention essentially as shown in Example 1 but varying the amount of graphite flakes utilized so as to determine the effect of this on Thymol Blue oxidation. The results are shown in FIG. 8 where the oxidation of Thymol Blue as measured by the percent light transmittance is plotted against the percent of graphite flakes used as a volume percentage of the electrolyte. FIG. 8 shows an increase in the oxidation rate as the amount of graphite was increased up to at least 20%. In these experiments, the electrolyte was agitated by means of a rotating stirring magnet in the bottom of the cell. A stainless steel cathode and graphite anode were used with an anode current density of about 75 ma/in$^2$.

EXAMPLE 5: OXIDATION VS. AGITATION RATE

Figure 9:
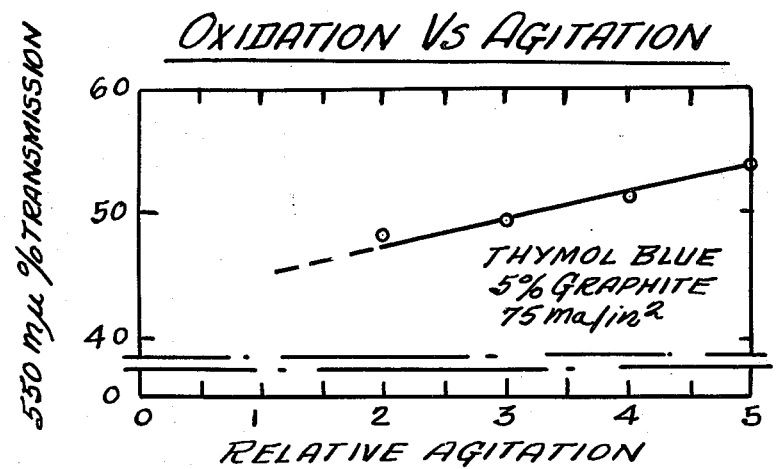

Testing was undertaken to determine the effect of the velocity of the graphite particles in the solution on the oxidation efficiency of the process as indicated by the percent light transmission. To carry out this testing, a Thymol Blue solution of known concentration was oxidized. Graphite (Dixon No. 1 flakes) was used in the amount of 5 volume percent, at a current density of 75 ma/in$^2$. The results are shown in FIG. 9 and it is to be noted that the curve in FIG. 9 is a linear function. The nature of this curve indicates the importance of providing high turbulence of the conductive particles. From these experiments, it was determined that agitation in the range from relatively low turbulent flow (3000 Reynolds) up to high turbulence (100,000 Reynolds) could be employed, although most preferably the turbulence will be in the range of 10,000 to 50,000.

EXAMPLE 6: ORGANIC DISCOLORATION

Experiments were conducted to determine the amount of organic discoloration caused by the generation of organic by-products in the cell as measured by the percent light transmittance versus the ampere-minutes at the electrodes at various pH values and with and without the use of agitated graphite flakes.

Figure 10:
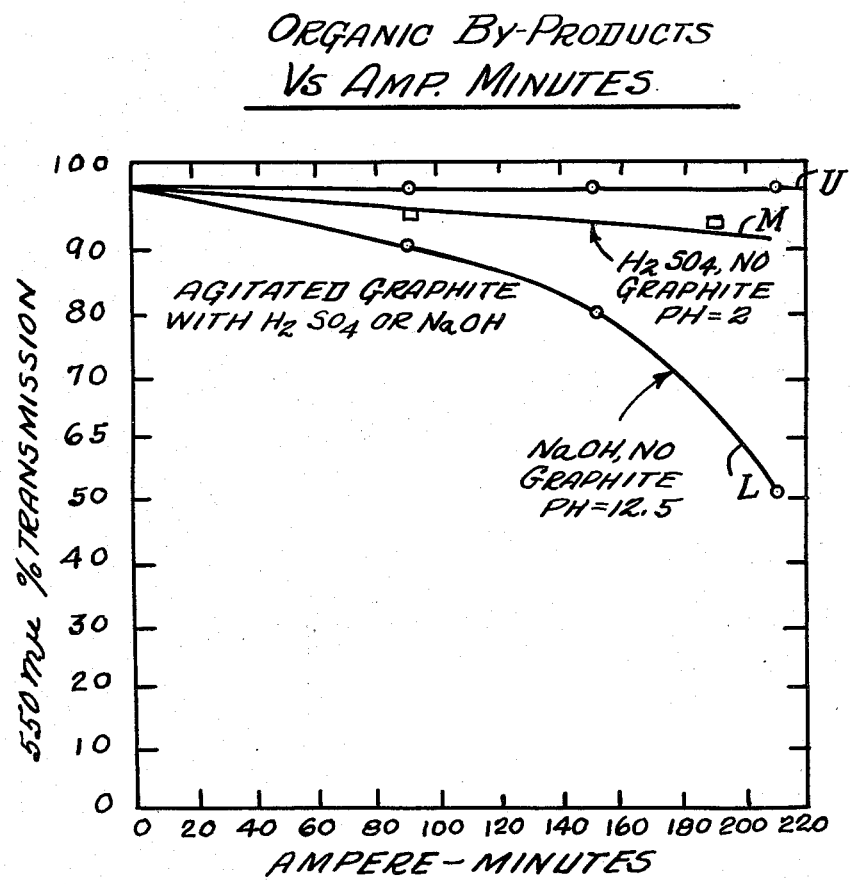

The results are shown in FIG. 10 wherein the lower curve (L) shows severe discoloration when caustic soda (NaOH) is used at a pH of 12.5 without graphite flakes. The middle curve (M) shows discoloration when sulfuric acid (H$_2$SO$_4$) is used at a pH of 2 without graphite flakes. The upper curve (U) shows that no discoloration occurs with either of these electrolytes using graphite flakes and turbulent conditions. In all these experiments, the cathode was stainless steel and the anode was graphite. The graphite flakes were used at a concentration of 20% by volume for the experiments represented by curve (U). In all the experiments, the electrolyte was agitated so as to be in the turbulent state and the anode current density was set at a high level of about 600 ma/cm$^2$ to accentuate the discoloration effect. The voltage was about 30 volts D.C. in all cases.

Examples 5 and 6 and FIGS. 9 and 10 show that the use of graphite flakes and turbulent electrolyte conditions, according to the invention, gives effective oxidation and the elimination of by-product formation.

EXAMPLE 7: OXIDATION OF AMMONIUM HYDROXIDE

Two sets of tests were undertaken to determine if ammonium hydroxide (NH$_4$OH) could be oxidized using the process of the invention. The experiments included introducing 300 mls. of 3N ammonium hydroxide solution and 30 volume percent of Dixon No. 1 flakes to a beaker. Agitation to obtain turbulent conditions was effected by magnetic stirring. In one set of tests, an aluminum cathode and a stainless steel anode were employed. In the second test, a graphite anode was employed with an aluminum cathode.

Figure 11:
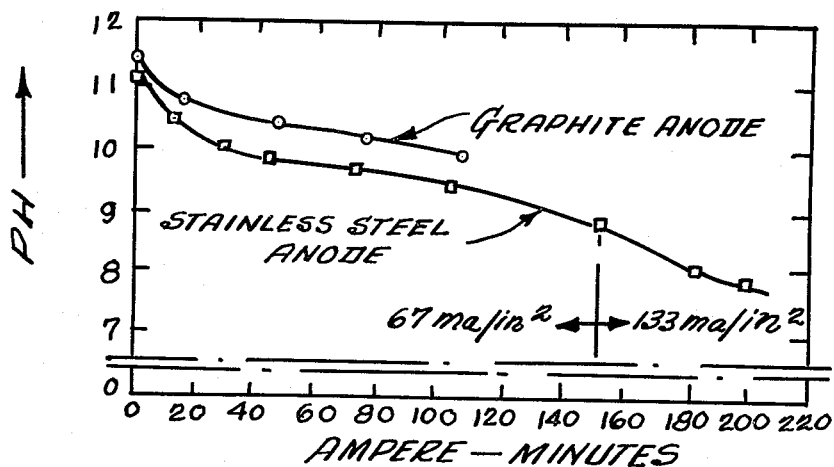

The results obtained are plotted in FIG. 11 and show that NH$_4$OH can be effectively oxidized using the present process with either graphite or stainless steel anodes. The oxidation rate is current-dependent as shown by the change of the slope of the curves, the greater oxidation being realized as the current is increased.

The removal of NH$_4$OH from water by the process of this invention as shown in this example is believed to represent the only known practical method for such removal.

EXAMPLE 8: EFFECT OF INSULATED ELECTRODES

Tests were undertaken to show that direct contact between the electrodes and the conductive particulate material, in accordance with the process of the invention, is unnecessary. The electrodes used in these tests (graphite anode and stainless steel cathode) were enveloped in three mm thick asbestos cloth. Turbulence and agitation were effected by stirring. Two tests (a) and (b) were performed, 300 ml of a Thymol Blue solution being subjected to oxidation in each test. Test (a) employed 30% by volume of Dixon No. 1 flakes suspended in the Thymol Blue solution while (b) employed 30% by volume of silver-coated glass beads. In both tests, the anode and cathode were wrapped in the asbestos cloth. The results obtained are plotted in FIG. 12 and show that oxidation of Thymol occurs even when the electrodes are covered so as to prevent direct contact with the particles. This indicates that the results of the invention are not dependent on a charge being picked up at one electrode and transferred to the suspended particles by contact as is necessary in conventional extended electrode processes known to the art. Apparently in the present process any charge involved is transferred by electrostatic induction from the electrode to the conductive particle.

Figure 12:
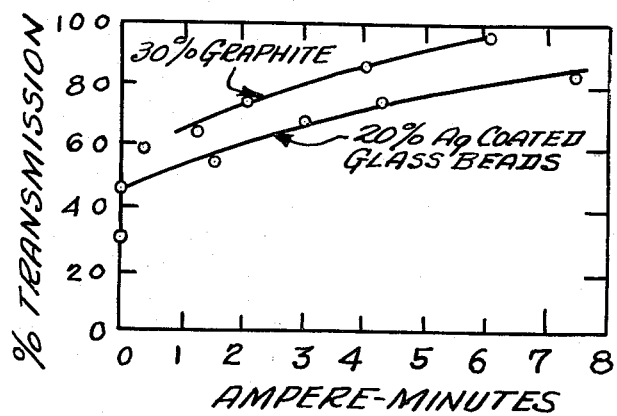

The results given in FIG. 12 also indicate that graphite flakes are more effective than spherical metal-coated glass particles. Although useful results can be obtained with the spherical metal-coated particles, graphite flakes or other forms of graphite particles are usually preferred over metal particles or metal-coated particles since many metals can engage in chemical reactions (resulting in side reactions, by-products formation and even possible destruction of the conductive metal of the electrode).

Various modifications and advantages in the present invention will be evident from the foregoing. The invention is not dependent on the use of catalysts or diaphragms although these may be used in certain circumstances if desired. The invention also does not depend on plating out contaminants at one or both of the electrodes or on effecting a reaction between one or both of the electrodes and/or electrolyte and contaminant therein. Advantages of the invention have been noted above and include, among others, the possibility of simultaneously reducing, oxidizing and/or agglomerating contaminants in aqueous electrolytes containing the same without undesired deposits being formed on the electrodes and/or particles employed. Faster treatment times and reduced electric power requirements are also possible.

The scope of the invention is defined in the following claims wherein:

What is claimed is:

1. An electrochemical process for reducing the level of contaminants from an aqueous electrolyte containing the contaminants comprising: suspending particles in the electrolyte in a reaction zone defined by a pair of electrodes to obtain a nonfluidized suspension containing from 1 to 40% by volume of the particles, establishing high turbulence corresponding to a Reynolds number between about 10,000 and about 50,000 and sufficient to maintain the particles in a state of violent agitation, applying D.C. current between the electrodes at a current density in amperes per unit area of electrode surface which does not exceed 1.0 amp/cm$^2$ and continuing the application of the D.C. current and the high turbulence at least until the contaminants are oxidized or reduced or coagulated.

2. A process as in claim 1 including the further subsequent step of removing coagulated or suspended contaminants by settling or physical treatment.

3. A process as in claim 1 wherein said particles range in size from 0.02 cm to 0.4 cm in maximum dimension and are present in the amount of 5 to 20% by volume.

4. A process as in claim 1 wherein the particles are electrically conductive.

5. A process as in claim 1 wherein the contaminants include ammonium hydroxide.

6. A process as in claim 1 wherein said turbulence is obtained by air sparging.

7. A process as in claim 1 wherein said turbulence is obtained by mechanical or magnetic stirring.

8. A process as in claim 1 wherein said turbulence is obtained by feeding the electrolyte into the reaction zone at high velocity against one or more baffles.

9. A process as in claim 1 wherein the electrolyte is sequentially treated in a plurality of reaction zones each having an electrode pair.

10. A process as in claim 9 wherein the reaction zones are all included in a single cell.

11. A process as in claim 1 wherein the current density in amperes per unit area of electrode surface ranges from 0.001 amp/cm$^2$ to 1.0 amp/cm$^2$.

12. A process as in claim 9 wherein the electrode spacings and voltages are individually adjustable.

13. A process as in claim 1 wherein at least one electrodialysis type membrane is included in the reaction zone and separates at least one pair of electrodes.

14. A process as in claim 1 wherein the particles are semi-conductive or insulative.

15. A process as in claim 1 wherein a combination of electrically conductive particles and semi-conductive or insulative particles is used.

16. A process as in claim 1 including the step of controlling foam.

17. A process as in claim 9 including the step of maintaining the particles in their respective reaction zones.

* * * * *